United States Patent [19]
Boye et al.

[11] Patent Number: 6,009,079
[45] Date of Patent: Dec. 28, 1999

[54] METHOD FOR MEASURING HDT-NIU AVAILABILITY

[75] Inventors: Emmanuel M. Boye, Matawan; Victor Bernard Lawrence, Holmdel, both of N.J.

[73] Assignee: Lucent Technologies Inc., Murray Hill, N.J.

[21] Appl. No.: 08/843,086

[22] Filed: Apr. 25, 1997

[51] Int. Cl.⁶ ...................................................... H04J 3/14
[52] U.S. Cl. ............................................ 370/242; 370/252
[58] Field of Search ..................................... 370/242, 244, 370/245, 252, 449; 714/25

[56] References Cited

U.S. PATENT DOCUMENTS

| | | | |
|---|---|---|---|
| 4,451,827 | 5/1984 | Kahn et al. | 340/825.52 |
| 4,742,518 | 5/1988 | Shedd | 370/243 |
| 5,553,059 | 9/1996 | Emerson et al. | 370/248 |
| 5,563,874 | 10/1996 | Kant | 370/252 |
| 5,566,161 | 10/1996 | Hartmann et al. | 370/249 |
| 5,828,655 | 10/1998 | Moura et al. | 370/252 |

*Primary Examiner*—Min Jung
*Attorney, Agent, or Firm*—Gibbons, Del Deo, Dolan, Griffinger & Vecchione

[57] ABSTRACT

The polling features of a resident hybrid fiber/coax (HFC) network platform are used to poll between a link a hybrid digital terminal (HDT) and a network interface unit (NIU). In the absence of a polling response from the NIU to a polling query from the HDT, the polling is regarded as unsuccessful. Hence, every polling query with no response from the NIU means the polling is unsuccessful and counted as a failed polling. The unsuccessful polling will be the result of an outage causing fault such as a physical break anywhere between the NIU and the HDT. Using an exception report format, only the unsuccessful pollings are reported and the counted. To calculate the unavailability of the link during any period of time, the number of counts within the period is acquired and used in the measurement process. The result is a statistical measure of the link unavailability during a specified time period, which may be one day, one year, or any suitable unit of time.

15 Claims, 4 Drawing Sheets

METHOD FOR MEASURING HDT-NIU AVAILABILITY

FIELD OF THE INVENTION

The present invention relates generally to assessing the availability of links between hybrid digital terminals (HDTs) and network interface units (NIUs) and relates more particularly to a method of polling the links between NIUs and HDTs without the need for additional hardware.

BACKGROUND OF THE INVENTION

As is generally known in the art, the unavailability of a link between a hybrid digital terminal (HDT), also known as a host digital terminal, and a network interface unit (NIU), also known as remote service units (RSUs), is conventionally assessed using parameters such as Mean Time to Repair (MTTR) and Mean Time Between Outages (MTBO). With these parameters, it is possible to calculate the usual link unavailability per year. Although these parameters are useful and have yielded acceptable results, using these parameters does not circumvent the inherent uncertainties associated with the measurement of the time between system failures and the time taken to recover from system defects.

Other methods of determining system failures in a network have been described in such U.S. Patents as U.S. Pat. No. 5,553,059, issued to Emerson et al on Sep. 3, 1996, and entitled, "Network Interface Unit Remote Test Pattern Generation;" U.S. Pat. No. 4,451,827, issued to Kahn et al on May 29, 1984, and entitled, "Local Area Communication Network;" and U.S. Pat. No. 5,566,161, issued to Hartmann et al on Oct. 15, 1996, and entitled, "Adaptive DS1 Frame Format Conversion Device for Remotely Monitoring and Testing the Performance of Telephone Circuits." However, all of these methods require additional hardware to implement the testing of the links between the various devices. For example, Emerson et al teach a system for isolating the direction of communication errors in the local loop of a digital data network. The system of Emerson et al uses a NIU loopback test to isolate transmission problems at a customer's premises from problems on the local loop. To do this, Emerson et al add a test pattern generation capability to the NIU, which allows the remote test system to determine whether the transmission problem on the local loop is in the network-to-customer premises direction or in the customer premises-to-network direction. As another example, Hartmann et al teach another modified NIU for remotely monitoring and testing the performance of DS1 telephone circuits, which are installed on the network side of an interface between customer premises equipment and equipment provided by the network provider. The improved NIU of Hartmann et al is used to non-intrusively collect and transmit full-time performance monitoring data to the network provider. Essentially, the NIU device of Hartmann et al provides this non-intrusive monitoring of the customer premises equipment by performing an adaptive real-time DS1 circuit frame format conversion, thus facilitating the conversion of the customer premises equipment generated signal frame formats to the Extended Superframe Format according to the ANSI T1.403 Standard with Performance Report Message.

However, all of these methods of assessing the unavailability of a link between an NIU and a HDT require significant hardware modifications to the NIU or to the network as a whole. This is very costly and therefore, there exists a need in the art to provide a method to assess whether a link has failed without the need for substantial additional hardware. The present invention addresses such a need.

SUMMARY OF THE INVENTION

Accordingly, one object of the present invention is to provide a cost effective method to assess the unavailability of links between hybrid digital terminals (HDTs) and network interface units (NIUs).

Another object of the present invention is to provide such a method with only the addition of a minimal amount of additional hardware.

Still another object of the present invention is to provide such a method which also provides a statistical measure of the link unavailability during a specified time period, such as a day or a year.

These and other objects of the invention are accomplished by the present method wherein the polling features of a resident hybrid fiber/coax (HFC) network platform are used to poll between the HDT and the NIU. In the absence of a polling response from the NIU to a polling query from the HDT, the polling is regarded as unsuccessful. Hence, every polling query with no response from the NIU means the polling is unsuccessful and counted as a failed polling. The unsuccessful polling will be the result of an outage causing fault such as a physical break anywhere between the NIU and the HDT. Using an exception report format, only the unsuccessful pollings are reported and then counted. To calculate the unavailability of the link during any period of time, the number of counts within the period is acquired and used in the measurement process. The result is a statistical measure of the link unavailability during a specified time period, which may be one day, one year, or any suitable unit of time.

According to the present invention, the polling method between the HDT and the NIU can be accomplished in two equally preferred embodiments. In one embodiment, a polling query is sent simultaneously to all NIUs homing on a given HDT, which then receives individual responses at separate times from the healthy NIUs whose links to the HDT are also healthy. Specifically, the time periods of interest, T, are divided into blocks of polling cycle time, that is, the time from the start to the end of one polling session, and then counting the number of failed polling cycles during the period, T, yields a running calculation of the unavailability of the links.

In the second embodiment of the present invention, a polling query is sent to the NIUs individually and consecutively, one after another. The NIU responses, depending on the health and status of the links, are received by the HDT in the same order in which the queries were sent. The polling failure history is acquired and stored in an expanded memory system (EMS). These history records are time stamped so that when an NIU fails polling at a time, $T_j$, and recovers at time, $T_k$, these time instants are available in the EMS. For each cycle of failure and subsequent recovery, the time interval $t_k-t_j$, can be measured/calculated. Therefore, at any given time, the failed time intervals, in a period between a specified zero time instant and the time instant, T, can be integrated and used in the calculation of the HDT-NIU link unavailability.

BRIEF DESCRIPTION OF THE DRAWINGS

These and other features of the invention will be better understood in light of the following Detailed Description of the Invention and the attached Figures wherein.

DETAILED DESCRIPTION OF THE INVENTION

Figure 1:
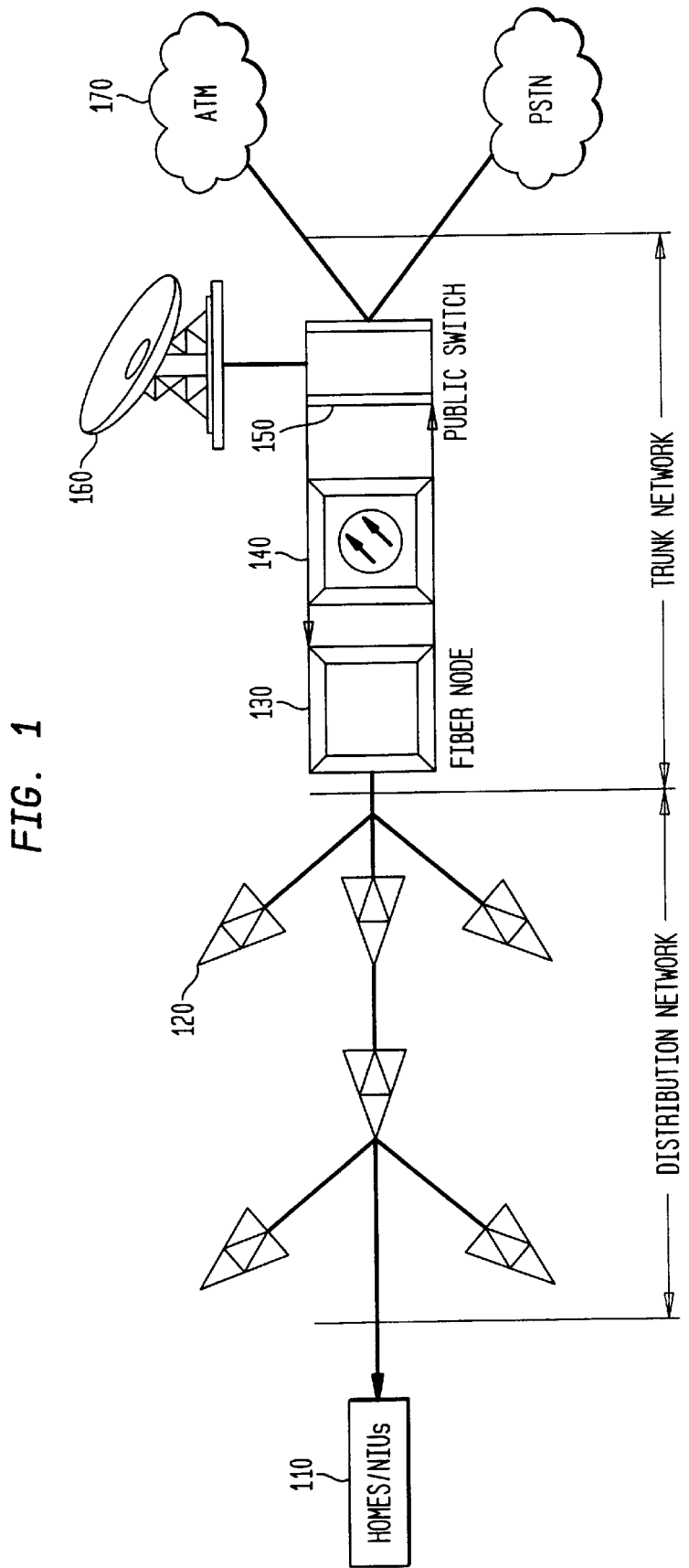
FIG. 1 is an illustration showing the elements of a hybrid fiber/coax network for which the present invention is useful.

Now referring to the FIG. 1, there is shown an illustration showing the elements of a hybrid fiber/coax network for which the present invention is useful. As shown, several different types of distribution networks are used to transfer different types of data, i.e. voice, data, video, etc., through a public switch 150. The different types of transfer mechanisms include satellites 160, asynchronous transfer mode (ATM) systems 170, or other systems such as PSTN. Through the hybrid fiber coax (HFC) network, the signals are sent through a fiber trunk switch 140 and then through various fiber nodes 130. Typically, the public switch 150, the fiber trunk switch 140 and the fiber nodes 130 are termed the trunk network through which all communications pass out to and from the network users. From the trunk network, the signals are distributed through the distribution network 120 out to the homes of the users 110 where the NIUs are located. As those skilled in the art recognize, the broadcast signals from the input to the trunk system comprise the broadcast or downstream signals and the signals from the users comprise the multiple access or upstream signals.

Obviously, the links between the trunk network and the distribution network are unavailable for certain periods of time for any number of reasons. Therefore, those skilled in the art need to determine this unavailability to access the links' viability.

Figure 2:
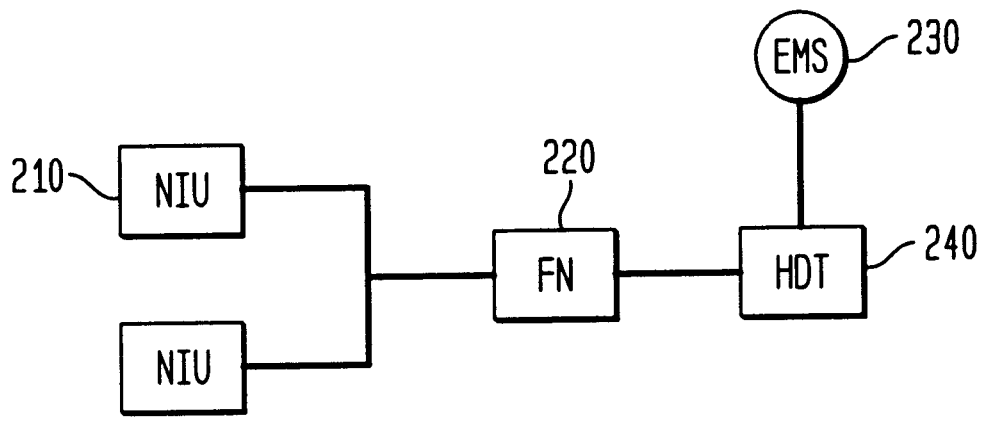
FIG. 2 is a block diagram depicting the elements of FIG. 1 and the architecture for the present method in a simplified block diagram format.

To determine the various links' viability, the polling features of a resident hybrid fiber/coax (HFC) network platform are used in the present invention to poll between the Hybrid Digital Terminal (HDT) and the Network Interface Units (NIUs). As shown in FIG. 2, an HDT 240 is coupled to a fiber node system (FN) 220, which, in turn, is coupled to the distributed NIUs 210.

Figure 3:
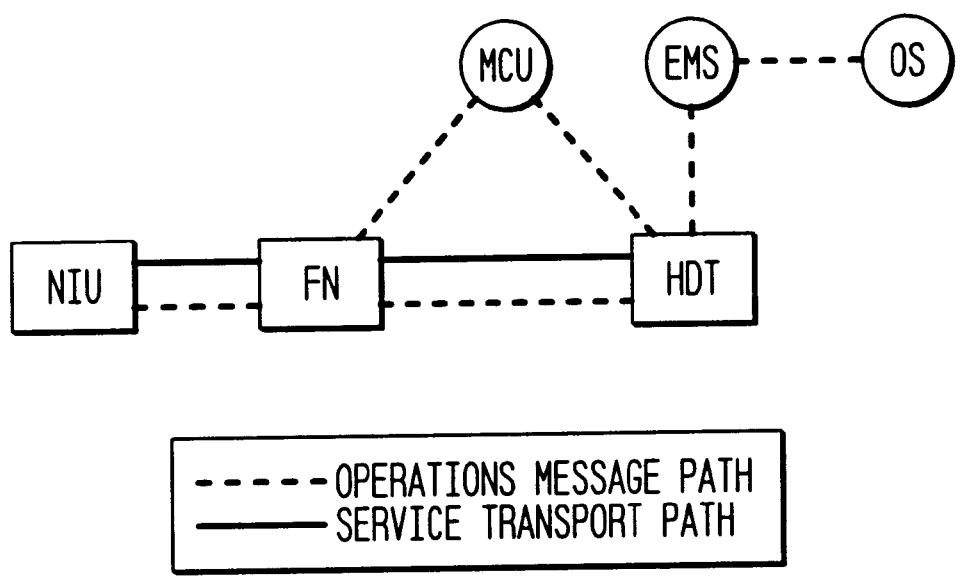
FIG. 3 is a block diagram illustrating the links for both service transport and operations messages used in the present invention.

FIG. 3 illustrates the HDT-NIU links for service transport and operations messages according to the present invention. As shown the operations messages path, i.e. those messages necessary to operate the network from the operating system (OS), includes a link from the OS terminal to some form of expanded memory system (EMS) (also shown in FIG. 2 as EMS 230), in which the link availability is stored. This operations message path, as those skilled in the art will readily recognize, continues through a master control unit (MCU) which controls the operating signals between the fiber node (FN) and the hybrid digital terminals (HDTs).

The service transport path includes those signals coming to and from the various services, i.e. ATM, PSTN, satellite, and the end users. Therefore, these signals include anything from the end users through the distributed system and then through the trunk system and vice versa.

In operation, the absence of a polling response from the NIU to a polling query from the HDT is regarded as unsuccessful. Hence, every polling query with no response from the NIU means the polling is unsuccessful and is counted as a failed polling. The unsuccessful polling is considered as a result of an outage, i.e. a fault such as a physical break anywhere between the NIU and the HDT. Using an exception report format, only the unsuccessful pollings are reported and then counted. To calculate the unavailability of the link during any period of time, the number of counts within the period is acquired and used in the measurement process. The result is a statistical measure of the link unavailability during a specified time period, which may be one day, one year, or any suitable unit of time.

This statistical analysis of the unavailability of a link can be done by having the HDT periodically poll the NIU for status information that is made available to the OS. Data collected during a polling session will provide enough information about the performance and health of the NIU. Hence, the inability of the HDT to receive this report from the NIU is an indication of a fault somewhere in the HDT-NIU link. Such a fault that leads to the unavailability of the link is identified and its duration measured so that an assessment of the yearly cumulative unavailability of the link can be made.

In order to calculate the unavailability of the HDT-NIU link, the following predetermined variables must also be measurable: the interval between polling times which will be represented by "a" minutes; and the length of a polling session which will be represented by "b" minutes. Therefore, by measuring the sum of a and b time blocks, i.e. each block equaling a+b, the number of time blocks, X, will equal (24)(60)/(a+b) or 1440/(a+b). The interval between the successive pollings is then taken as the time interval between the end of one polling session and the beginning of the following polling session. Thus, given a bit error rate (BER) threshold below which the link would be declared unavailable, a number, P, of the time blocks during which failure of the link would occur can be calculated. If P and X are measured over a period of one day, then R=(P/X) 100%. This represents the percentage of the Xs during which the link is unavailable. Under certain important assumption(s), this fraction will also represent the part of the day (or year) during which the link is down. One of these assumptions is that the link remains functional before and during polling for the link to be declared available, i.e., the link is assumed available during polling and also during the time period while no messages pass between the HDT and the NIU. This analysis is valid regardless of the cause of the link going down. In fact, the cause may be a physical cut or a component failure anywhere in the system.

Even though it is idle and not reporting to the HDT during the idle time a, the NIU is operational and is activated at the polling time. Thus, the probability that the link is down during the idle time and becomes activated at the polling time is equal to one minus the probability that the link is up during idle time and becomes activated at the polling, i.e., 1−a/(a+b) or b/(a+b). Therefore, if the fraction, R, of a day (or year) is corrected using the weighting factor of b/(a+b), then m=(P/X)b/(a+b). Hence, knowing all the variables, m can be calculated to represent the fraction of the year during which the HDT-NIU link is down. This can be compared to the usual 49 minutes per year value. It should be noted that in the special case where the polling is continuous so that a is practically zero, the weighting factor is unity, and m=P/X.

The above analysis has focused on the time blocks, X, and also on the statistical changes in X. Therefore, for the results of the analysis to be valid, the unit of time over which X is known and P counted, must be appropriately set. Those skilled in the art will recognize that the statistical measure discussed above can be accomplished by using the existing polling feature of the hybrid fiber/coax (HFC) platform and only requires a counter device to capture and count the existing number of the polling times during which the NIU-HDT link fails for whatever reason. In this form of implementation, the performance parameter to be monitored is the output of the counter device. Therefore, assuming a continuous polling, a will equal zero (for all practical purposes), and m=P/X, where X equals 1440/b with b being measured in minutes. By calculating P, which is the output of the counter device, m can, therefore, be easily calculated. It must be noted, however, that for this example, X has been based on time blocks during a day of 24 hours. Time units other than the day can obviously be used. Thus, various values of X based on the week (7 days) or the year (365 days) may be derived and used.

According to the present invention, the polling method used to determine the above stated unavailability of the HDT-NIU link can be accomplished in two equally preferred embodiments. In the first embodiment, a polling query is sent simultaneously to all NIUs homing on a given HDT, which then receives individual responses at separate times from the healthy NIUs whose links to the HDT are also healthy. Specifically, the time periods of interest, T, are divided into blocks of polling cycle time, that is, the time from the start to the end of one polling session, and then counting the number of failed polling cycles during the period, T, thus yielding a running calculation of the unavailability.

Figure 4:
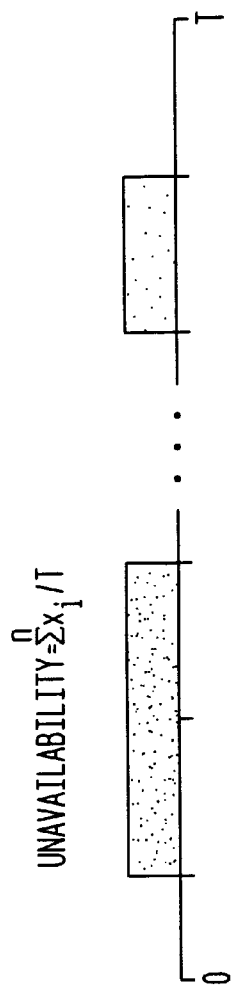
FIG. 4 is a time line diagram of the method according to one embodiment of the present invention.

Specifically, in this measurement process, the unavailability is obtained as follows:

$$\text{unavailability} = \sum_{}^{n} \frac{x_i}{T}$$

where $x_i$ is the first upto and including the $n^{th}$ polling cycle time when the polling failed. The interval (0,T) is that for which the link unavailability is to be determined. This is graphically illustrated in FIG. 4 where the lined regions represent the calculation of the unavailability of the HDT-NIU link. As indicated earlier, the polling may be accomplished via a broadcast message from the HDT to all NIUs. It may also be accomplished by individual polling of all NIUs in a sequence to be specified by the operators. For each NIU, the polling cycle time is the time between the starts of two consecutive polling sessions.

In the second embodiment of the present invention, a polling query is sent to the NIUs individually and consecutively, one after another. The NIU responses, depending on the health and status of the links, are received by the HDT in the same order in which the queries were sent. The polling failure history is acquired and stored in an expanded memory system (EMS). These history records are time stamped so that when an NIU fails polling at a time, $T_j$, and recovers at time, $T_k$, these time instants are available in the EMS.

Figure 5:
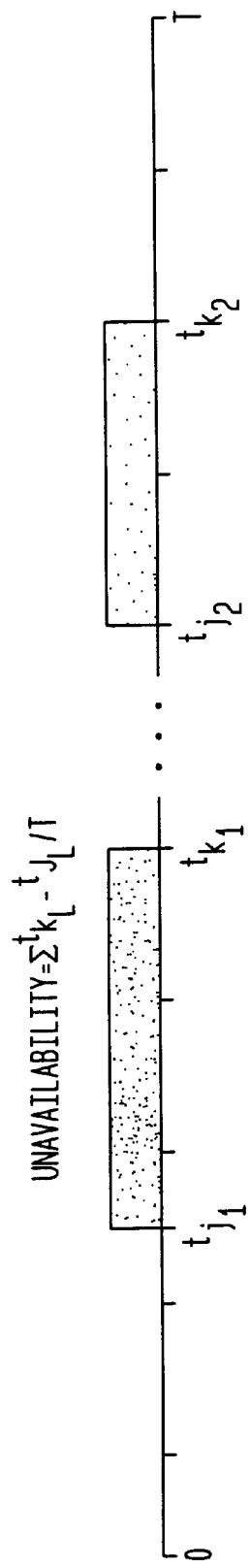
FIG. 5 is a time line diagram of the method according to another embodiment of the present invention.

Specifically, for each cycle of failure and subsequent recovery, the time interval, $t_k-t_j$, can be measured/calculated and at any given instant of time, all failed time intervals in the period between a specified zero time instant and the time instant, T, can be integrated and used in the calculation of the HDT-NIU link unavailability. Thus, a measure of the link unavailability can be obtained from an expression of the form:

$$\text{unavailability} = \sum \frac{t_{k_i} - t_{k_j}}{T}$$

where $t_{j_i}$ is the instant of time when polling fails during the $i^{th}$ cycle, and $t_{k_i}$ is the time instant when the NIU recovers form polling failure during the same $i^{th}$ cycle. This is graphically illustrated in FIG. 5 where the lined regions represent the calculation of the unavailability of the HDT-NIU link between $t_{j_i}$ and $t_{k_i}$.

The EMS should, therefore, have the capability to provide a measure of the link unavailability at any time and for any given length of time. However, it is important to note that data required for the calculation of the unavailability value can be collected in real time and processed in a batch mode in order to save real time processor activity.

Figure 6:
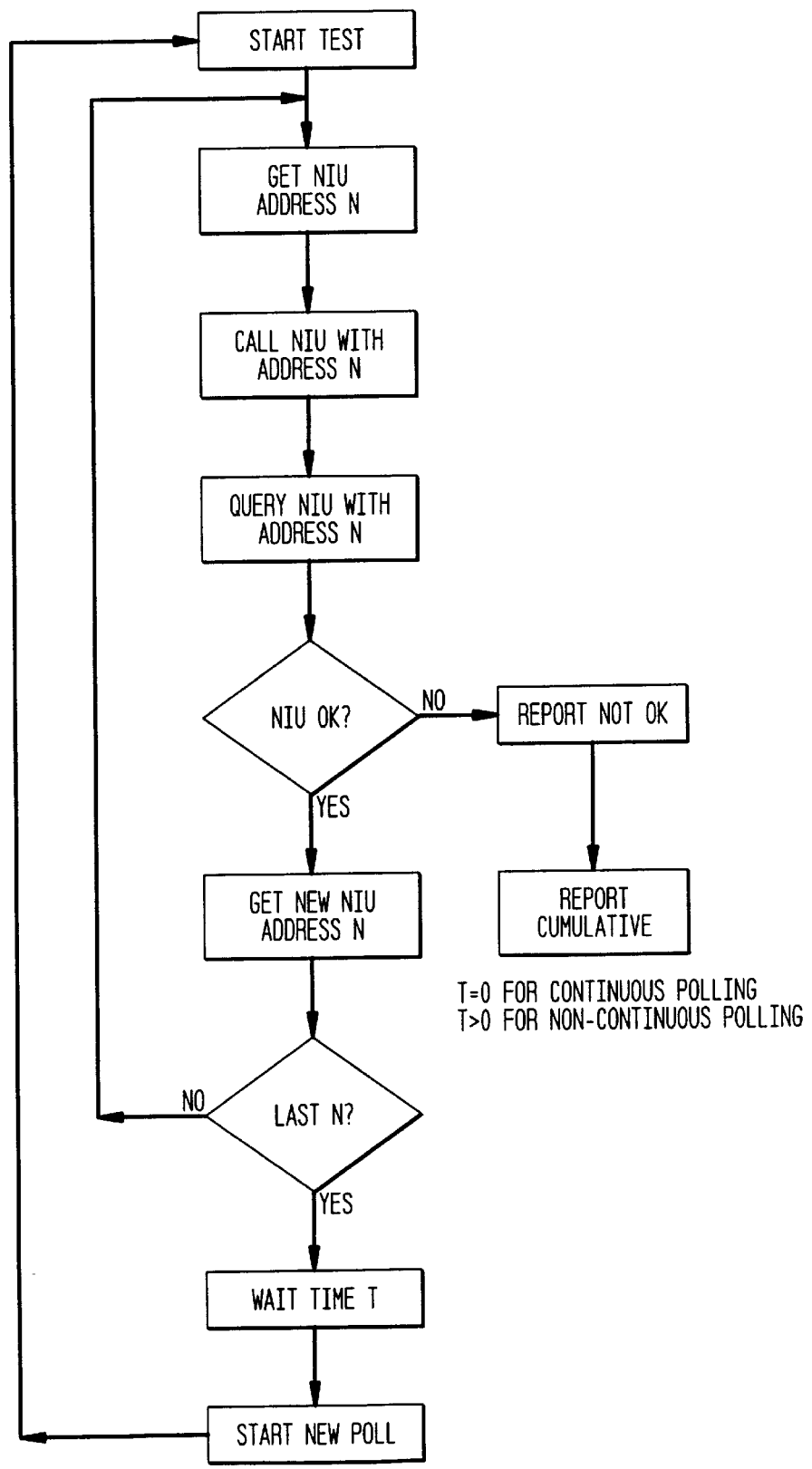
FIG. 6 is a flow chart of the method of the second embodiment of the present invention.

FIG. 6 is a flow chart illustrating the method according to this second embodiment of the present invention. As shown, the address of a particular NIU is obtained and then, with this specific address, the NIU can be queried/polled. If the report comes back negative, this is stored in a cumulative report in the EMS. If the report comes back positive, another NIU address is obtained. A check is made to determine if it was the address of the preceding query/poll. Obviously, if it was the same address, another address is obtained. If the address is different, then the query/polling sequence is reinitiated after waiting a time, T. As indicated, time, T, can be zero for continuous polling or T can be any number greater than zero.

Using any one of the embodiments discussed above, network administrator can provide a reliable and prompt measure of the HDT-NIU link unavailability. Data for the measurement will be acquired and analyzed in the EMS which, using the appropriate algorithm in either embodiment, shall have the capability to calculate the link unavailability in minutes per year or in any appropriate units of measure. Thus, the network administrator can promptly take the necessary corrective actions should the unavailability increase to an undesired level.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claims is reserved.

What is claimed is:

1. For a network having a host digital terminal (HDT), at least one network interface unit (NIU) and polling means for a resident hybrid fiber/coax (HFC) network platform, a method for determining unavailability of links between the HDT and the NIU, the method comprising the steps of:

polling the NIU from the HDT a total number of times during a given length of time;

determining whether polling of the NIU is unsuccessful, wherein unsuccessful polling is a predetermined number of failed polling responses of the NIU; and determining a number of unsuccessful pollings of the NIU during the given length of time;

wherein NIU availability is a function of the number of unsuccessful pollings and the total number of pollings.

2. The method as recited in claim 1, further comprising the step of dividing into the given length of time a sum of an interval between polling times and a length of a polling session.

3. The method as recited in claim 1 further comprising the step of calculating an unavailability of links, wherein the unavailability of links is a ratio of a number of time blocks of unavailability of links to a number of time blocks equal to a sum of an interval between polling times and a length of a polling session.

4. The method as recited in claim 1 further comprising the step of calculating a fraction of a year of unavailability of links, wherein the fraction of the year is the product of the unavailability of links and a length of a polling session which is divided by a sum of an interval between polling times and the length of the polling session.

5. The method as recited in claim 1 further comprising the step of statistically measuring availability of links between the HDT and the NIU during a specified period of time.

6. The method as recited in claim 5, wherein an exception report format of only the unsuccessful pollings are reported, counted and used in the statistical measure.

7. For a network having a host digital terminal (HDT), at least one network interface unit (NIU) and polling means for a resident hybrid fiber/coax (HFC) network platform, a method for determining unavailability of links between the HDT and the NIU, the method comprising the steps of:

simultaneously polling all NIUs from the HDT;

receiving individual responses at separate times from the NIUs that have a link availability;

dividing a polling cycle time into blocks;

counting a number of failed polling cycles during a specified period of time; and, calculating the unavailability of links.

8. The method as recited in claim 7 wherein the unavailability of links is determined by $$\sum_{}^{n} \frac{x_i}{T},$$

where $x_i$ is a first upto and including $n^{th}$ polling cycle time when polling failed and T is equal to a specified time period.

9. The method of claim 7 wherein a broadcast message is sent from the HDT to the NIUs.

10. The method of claim 7 wherein the responses from the NIUs are received by the HDT in a predetermined sequence according to a numerical address.

11. For a network having a host digital terminal (HDT), at least one network interface unit (NIU) and polling means for a resident hybrid fiber/coax (HFC) network platform, a method for determining unavailability of links between the HDT and NIUs, the method comprising the steps of:

polling the NIUs individually and consecutively one after another;

receiving polls from the NIUs in a same order as polling the NIUs; and counting a number of failed polling cycles during a specified period of time; and, calculating the unavailability of links.

12. The method as recited in claim 11 wherein the unavailability of links is determined by $$\sum \frac{t_{k_i} - t_{k_i}}{T}$$

where $t_{j_i}$ is an instant of time when polling fails during an $I^{th}$ cycle, and $t_{k_i}$ is an time instant when the NIU recovers form polling failure during a same $i^{th}$ cycle.

13. The method as recited in claim 11 further comprising the step of storing results of the polls in an expanded memory system.

14. The method of claim 13 wherein the results of the polls are time stamped.

15. The method of claim 13 wherein the polling to the NIUs is accomplished by sending broadcast messages to a predetermined address of the NIUs.

* * * * *